United States Patent [19]

Belter et al.

[11] Patent Number: 4,723,783
[45] Date of Patent: Feb. 9, 1988

[54] ALUMINUM FACED EXPANDED GRAPHITE GASKET AND METHOD OF MAKING SAME

[75] Inventors: Jerome G. Belter, Mt. Prospect; James H. Larsen, Brookfield, both of Ill.

[73] Assignee: Dana Corporation, Toledo, Ohio

[21] Appl. No.: 870,509

[22] Filed: Jun. 4, 1986

[51] Int. Cl.⁴ .............................................. F16J 15/12
[52] U.S. Cl. .............................. 277/235 B; 277/166; 277/234; 29/521
[58] Field of Search ................... 277/1, 166, 232–234, 277/235 R, 235 A, 235 B, 236; 264/274; 156/244.18, 251, 252; 29/513, 515, 521

[56] References Cited

U.S. PATENT DOCUMENTS

| | | |
|---|---|---|
| 1,897,088 | 2/1933 | Victor .......................... 277/235 B X |
| 2,888,742 | 6/1959 | Stumbock ......................... 29/521 X |
| 3,970,322 | 7/1976 | Stecher et al. .............. 277/235 B X |
| 4,140,323 | 2/1979 | Jacobs ......................... 277/235 B X |
| 4,169,185 | 9/1979 | Bhatia .......................... 277/235 A X |
| 4,333,975 | 6/1982 | Booth ........................... 277/235 B X |

Primary Examiner—Robert S. Ward
Attorney, Agent, or Firm—MacMillan, Sobanski & Todd

[57] ABSTRACT

A composite aluminum faced, expanded graphite gasket includes at least one layer of aluminum mechanically secured to an expanded graphite layer. A plurality of projections or lugs extend from one surface of the aluminum layer and are mechanically clinched to the graphite layer to secure the layers together. The exposed surface of the aluminum is coated with a resilient sealing compound. A gasket including two aluminum layers mechanically clinched to the faces of the graphite layer as well as a method of fabricating both gasket configurations are also set forth.

18 Claims, 4 Drawing Figures

ALUMINUM FACED EXPANDED GRAPHITE GASKET AND METHOD OF MAKING SAME

BACKGROUND OF THE INVENTION

The present invention relates in general to gasket configurations and in particular to multi-layer or composite gaskets of expanded graphite and aluminum which are mechanically secured together.

Starting from the general definition of a gasket as being a conformable, replaceable member for sealing areas and passageways between two juxtaposed members, the configuration and fabrication of gaskets has become increasingly complex and application specific. The once nearly ubiquitous cork gasket has been replaced by sophisticated, multi-layered products designed for specific applications.

One of the significant operating parameters that has prompted this change, at least within the automotive and vehicle field, is the increased operating temperatures of internal combustion engines in this service. No other single operating parameter so deleteriously affects performance and extended service life to the extent elevated operating temperature does.

Other difficulties are related to such elevated operating temperatures. They are the temperature cycling attendant each duty cycle of the engine and the dimensional expansion and contraction of the gasketed surfaces resulting from such operating temperature and temperature cycling. Another problem is the compression of the gasket which may change due to different temperature coefficients of expansion between the materials of the gasket, the gasketed member and the associated fasteners. Depending upon the composition of these components, increasing temperature may increase the compression of the gasket which, if it does not properly recover will be loose and perhaps leak at lower temperatures. This problem can, of course, occur in reverse, resulting in leakage at elevated temperatures. Ideally, a gasket will be sufficiently resilient to maintain its seal in spite of such temperature/compression cycling.

One commonly utilized gasket material has been steel. Such a gasket was effective in many applications but, as an increasing number of engine components become fabricated of other materials, the thermal coefficient of expansion differential often results in unsatisfactory gasket performance.

Another commonly used gasket material is graphite. Frequently, it is utilized in an expanded form with internal supporting matrices of other materials to provide suitable strength or it may be impregnated or mixed with other materials, again to provide suitable strength and durability, especially prior to installation.

One gasket application that has proven especially difficult relates to throttle body fuel injection housings. They operate at elevated temperatures, which rise to peak temperatures several minutes after shutdown, prepare and provide a fuel/air mixture deleterious to many gasket materials, and must be gasketed to the engine intake manifold.

A review of currently available gasket configurations reveals that improvements in both fabrication techniques and product performance are both desirable and possible.

SUMMARY OF THE INVENTION

The present invention comprehends a composite aluminum faced, expanded graphite gasket having at least one layer of aluminum mechanically secured to an expanded graphite layer. A plurality of small projections or lugs are formed on one surface of the aluminum layer by piercing it and bending the edges of the resulting apertures into generally perpendicular projections. The aluminum layer and extending lugs are mechanically clinched to the graphite by compressing them. The face of the aluminum layer opposite the expanded graphite layer includes a surface coating of a resilient, conformable material such as a sealing resin, silicon or the like.

The gasket may also be fabricated of two aluminum layers with the projections directed inwardly such that a medially disposed layer of expanded graphite is clinched by the projections of lugs from both aluminum layers and the three layers are mechanically secured together. In this configuration, a resilent, conformable coating may be applied to the outer surfaces of both aluminum layers.

Thus it is an object of the present invention to provide a composite aluminum faced, expanded graphite gasket wherein the graphite layer is mechanically secured to the aluminum layer.

It is a further object of the present invention to provide a composite aluminum faced, expanded graphite gasket having a plurality of perforations in the aluminum layer and a plurality of projections or lugs which mechanically secure the graphite layer to the aluminum layer.

It is still a further object of the present invention to provide a composite aluminum faced, graphite gasket having a pair of aluminum layers mechanically secured to a centrally disposed expanded graphite layer.

It is a still further object of the present invention to provide a composite aluminum faced, expanded graphite gasket having a conformable, resilient coating on at least one outer surface on the aluminum layer.

Further objects and advantages of the present invention will become apparent by reference to the following description of the preferred embodiments and appended drawings.

DESCRIPTION OF PREFERRED EMBODIMENT

Figure 1:
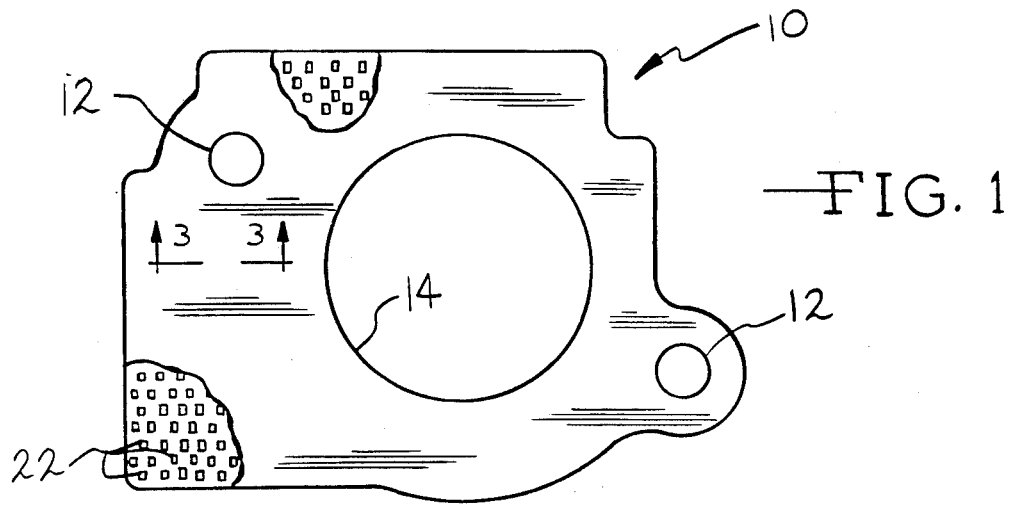
FIG. 1 is a top, plan view of a composite aluminum faced, expanded graphite gasket according to the present invention.

Referring now to FIG. 1, a composite aluminum faced, expanded graphite gasket is illustrated and generally designated by the reference numeral 10. At the outset, it should be understood that the gasket 10 illustrated in FIG. 1 is merely a representative shape of the type intended for installation between a throttle body fuel injection housing and an engine intake manifold. As the application of the herein disclosed gasket is not so limited, the shape of the gasket 10 in FIG. 1 should be understood to be for purposes of illustration and example only and that virtually any gasket configuration for any specific application such as an engine head gasket or on an engine having an open deck block configuration, to name two examples, may be blanked from sheet material fabricated according to the following disclosure. As will readily be appreciated, the gasket 10 may include smaller apertures 12 for receiving securement means such as threaded fasteners (not illustrated) and larger apertures such as the aperture 14 through which fluids may pass or which may surround an opening for a piston or other engine component (not illustrated).

Figure 2:
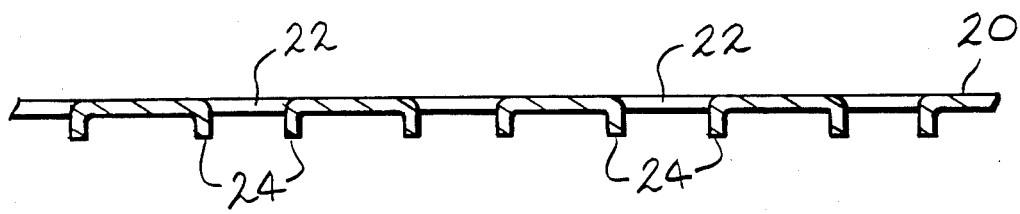
FIG. 2 is a fragmentary, sectional view of an aluminum layer which has been pierced to form apertures and projections.
Figure 3:
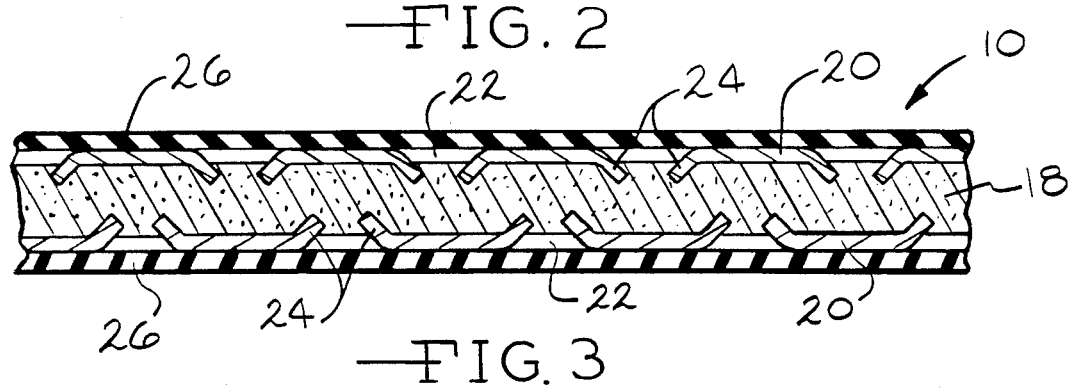
FIG. 3 is a fragmentary, sectional view of a first embodiment of an aluminum faced, expanded graphite gasket having two aluminum layers mechanically clinched to an expanded graphite core, taken along line 3—3 of FIG. 1.

Referring now to FIGS. 2 and 3, in a first embodiment, the gasket 10 comprises a centrally disposed core or layer of expanded graphite 18. The thickness of the expanded graphite layer 18 is preferably in the range of from about 0.035 inches to 0.050 inches, though the gasket 10 maybe, of course, fabricated with an expanded graphite layer 18 of greater or lesser thickness. The expanded graphite layer 18 is initially prepared as a flexible sheet by roll or compression combining.

The invention further comprehends incorporation of at least one aluminum layer 20 mechanically clinched to the expanded graphite layer 18. The composite gasket so formed exhibits good mechanical strength, flexibility, sealability and suitability for blanking, cutting and punching into complex configurations. The aluminum layer 20 is preferably about 0.006 inches in thickness, and preferably in the range from 0.003 inches to 0.009 inches in thickness. These limits are established by the insufficient strength of layers thinner than that recited and the insignificant benefits of layers thicker than that recited.

As illustrated in FIG. 2, the aluminum layer 20 is pierced to form a staggered grid work of apertures 22 on offset centers between about 0.1 and 0.2 inches. The piercing preferably produces a generally "H" shaped pattern whereby the opposed pair of tabs formed by the piercing operation are formed into lugs or projections 24 extending generally perpendicularly to the plane of the aluminum layer 20. The orientation of the lugs or projections 24 relative to the plane of the aluminum layer 20 is not critical but must be such as to encourage entry of the projections 24 into the graphite layer 18 and mechanical clinching and securement to the graphite layer 18 as will be more fully described directly below.

FIG. 3 illustrates the first embodiment of an assembled composite aluminum faced expanded graphite gasket 10 having a pair of aluminum layers 20 which are mechanically clinched and secured to the centrally disposed graphite layer 18. Such mechanical clinching and securement is accomplished by positioning the layers of aluminum 20 with their projections 24 facing and contacting the expanded graphite layer 18. The layers 18 and 20 are then compressed by passing them through rollers or exerting pressure on the juxtaposed, coextensive layers 18 and 20 through other suitable means. The layers 18 and 20 are compressed sufficiently that the lugs or projections 24 pierce, engage and are bent by such engagement into generally an oblique orientation as illustrated in FIG. 3 whereby the aluminum layers 20 and specifically the projections 24 securely mechanically grip the centrally disposed expanded graphite layer 18, thereby producing a unitary composite structure.

Finally, on the outer surface of each of the aluminum layers 20 is preferably uniformly disposed a relatively soft, conformable coating of sealing material 26 such as a resin or silicone at a thickness of from 0.0002 inches to 0.0008 inches. The coating of sealing material 26 acts as a highly conformable coating to ensure a secure and leakproof seal between the mechanical elements between which the gasket 10 is interposed.

Figure 4:
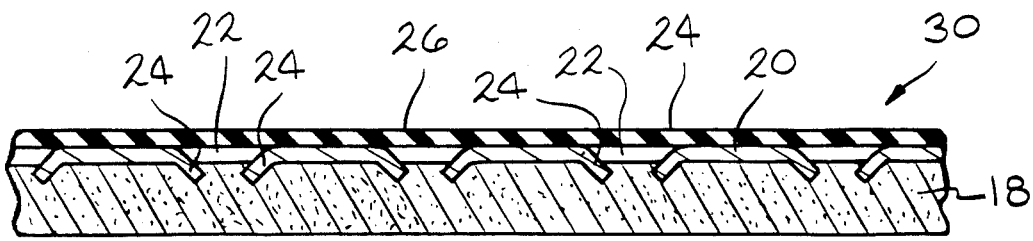
FIG. 4 is a fragmentary, sectional view of a second embodiment of an aluminum faced, expanded graphite gasket having a single aluminum layer mechanically clinched to a layer of expanded graphite, taken along line 3—3 of FIG. 1.

FIG. 4 illustrates a second embodiment 30 of the gasket according to the present invention wherein an expanded graphite layer 18 is mechanically clinched and secured to a single aluminum layer 20 having similarly disposed apertures 22 and lugs or projections 24. As will be readily apparent, the sole yet significant difference between this embodiment and the first embodiment 10 illustrated in FIG. 3 is incorporation of a single aluminum layer 20. The second embodiment 30 is assembled in the same fashion, that is, by assembling an aluminum layer 20 which has been pierced to form apertures 22 and projections 24 and an expanded graphite layer 18 and applying uniform pressure by rollers or other suitable compressing means to force the projections 24 into the expanded graphite layer 18 thereby deforming the projections 24 such that they mechanically grip and secure the expanded graphite layer 18 to the aluminum layer 20. A relatively soft, conformable coating of sealing material 26 is then applied to the exposed surface of the aluminum layer 20. This layer of sealing material 26 in thickness and performance is in all respects the same as the layer 26 described above with regard to the first embodiment gasket 10.

Thus it will be appreciated that the composite aluminum faced, expanded graphite gaskets 10 and 30 of the present invention, and the present method, provide several manufacturing, installation and performance benefits. First of all, the materials utilized, particularly the aluminum layer 20 and the expanded graphite layer 18 are conventional materials and are readily available. In their planar configurations, they are relatively easy to handle and are thus readily assembled and compressed into the final composite configuration.

The pierced aluminum layer 20 having the projections 24 provides specific benefits as well. First of all, the forming of the lugs or projections 24 cold works the aluminum and thus provides greater initial strength to the aluminum layer 20 than it would otherwise have. Secondly, the mechanical clinching provided by the lugs 24 eliminates the use of adhesives which have typically previously been utilized to secure such gasket components together. This eliminates possible failure due to problems with temperature related breakdown of an adhesive layer. The clinched securement between the aluminum layer 20 and expanded graphite layer 18 also provides greater rigidity to the gasket. The elimination of adhesive layers also improves heat transfer through the gasket. Punching and blanking operations of the gasket material into a given planar configuration having a desired outline and apertures are enhanced as well due to the stability the aluminum layer or layers provides to the composite gasket. Finally, the thin layer of resin or silicone coating material 26 provides a highly conformable surface which assists attainment and maintenance of a complete seal at low compressive levels. The other materials, as well, provide and maintain exceptional sealing characteristics in most operating environments, even those known to attack other gasket materials.

The foregoing disclosure is the best mode devised by the inventors for practicing this invention. It is apparent, however, that apparatus and methods incorporating modifications and variations will be obvious to one skilled in the art of gaskets and methods for producing same. Inasmuch as the foregoing disclosure is intended to enable one skilled in the pertinent art to practice the instant invention, it should include such aforementioned obvious variations and be limited only by the spirit and scope of the following claims.

We claim:

1. A composite gasket for sealing juxtaposed engine components comprising, in combination,
   a layer of expanded graphite material,
   at least one layer of aluminum having a plurality of projection means extending into said layer of graphite material for mechanically securing together said aluminum and said graphite layers, and
   a layer of coating material disposed on the outer surface of said aluminum layer.

2. The composite gasket of claim 1 wherein said aluminum layer is between approximately 0.003 inches and 0.009 inches in thickness.

3. The composite gasket of claim 1 wherein said aluminum layer is approximately 0.006 inches in thickness.

4. The composite gasket of claim 1 wherein said layer of coating material is resin having a thickness of between approximately 0.0002 inches and 0.0008 inches.

5. The composite gasket of claim 1 wherein said layer of coating material is silicone having a thickness of between approximately 0.0002 inches and 0.0008 inches.

6. The composite gasket of claim 1 further including a second layer of aluminum having a plurality of projection means extending into said layer of graphite material for mechanically securing together said first and said second layers of aluminum and said graphite layer.

7. The composite gasket of claim 6 wherein said first and said second aluminum layers are approximately 0.003 to 0.009 inches in thickness and said layer of coating material is between approximately 0.0002 inches and 0.0008 inches in thickness.

8. An aluminum faced expanded graphite composite gasket for sealing between juxtaposed engine components comprising, in combination,
   a layer of expanded graphite material,
   at least one layer of aluminum having a plurality of apertures and a plurality of formed projections extending from the edges of said apertures, said projections extending into said layer of graphite material and mechanically clinching said aluminum and said graphite layers together, and
   a layer of resilient coating material disposed on the outer surface of said aluminum layer.

9. The composite gasket of claim 8 wherein said aluminum layer is approximately 0.006 inches in thickness.

10. The composite gasket of claim 8 wherein said layer of resilient coating material is resin having a thickness of between 0.0002 inches and 0.0008 inches.

11. The composite gasket of claim 8 wherein said layer of resilient coating material is silicon having a thickness of between 0.0002 inches and 0.0008 inches.

12. The composite gasket of claim 8 further including a second layer of aluminum having a plurality of apertures and a plurality of projections extending from the edges of said apertures, said projections mechanically clinching together said aluminum layers and said graphite layer.

13. The composite gasket of claim 8 wherein said projections are disposed at an angle to the plane of said gasket.

14. The composite gasket of claim 8 wherein said apertures having a pair of said projections extending from said edges.

15. A method of fabricating a composite gasket, comprising the steps of:
    providing at least one layer of aluminum,
    perforating said layer of aluminum to provide apertures having at least one projection extending from an edge thereof,
    providing a layer of expanded graphite material,
    positioning said layer of aluminum on said layer of expanded graphite material with said projections adjacent said layer of expanded graphite material,
    compressing said aluminum layer and said graphite layer together to mechanically secure them to one another, and
    coating the exposed surface of said aluminum layer with a resilient coating material.

16. The method of fabricating a composite gasket of claim 15 further including the steps of
    providing a second layer of aluminum,
    perforating said second layer of aluminum to provide apertures having at least one projection extending from an edge thereof,
    positioning said layers of aluminum on opposed faces of said layers of expanded graphite material with said projections adjacent said layer of expanded graphite material, and
    compressing said layers to mechanically secure them together.

17. The method of claim 15 wherein said projections are initially formed substantially perpendicularly to the plane of said aluminum layer.

18. The method of claim 15 wherein said compressing step is accomplished by passing said layers through rollers.

* * * * *